(12) United States Patent
Sano (10) Patent No.: US 10,713,806 B2
(45) Date of Patent: Jul. 14, 2020

(54) IMAGE PROCESSING APPARATUS AND IMAGE PROCESSING SYSTEM

(71) Applicants: Kabushiki Kaisha Toshiba, Minato-ku (JP); Toshiba Electronic Devices & Storage Corporation, Minato-ku (JP)

(72) Inventor: Toru Sano, Kawasaki (JP)

(73) Assignees: Kabushiki Kaisha Toshiba, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 224 days.

(21) Appl. No.: 15/922,940

(22) Filed: Mar. 16, 2018

(65) Prior Publication Data

US 2019/0087971 A1   Mar. 21, 2019

(30) Foreign Application Priority Data

Sep. 21, 2017   (JP) .................................. 2017-181073

(51) Int. Cl.
*G06T 7/593* (2017.01)
*G06T 7/80* (2017.01)
(Continued)

(52) U.S. Cl.
CPC ............... *G06T 7/593* (2017.01); *G06T 7/85* (2017.01); *G06T 7/97* (2017.01); *G06T 2207/10012* (2013.01); *H04N 2013/0081* (2013.01)

(58) Field of Classification Search
None
See application file for complete search history.

(56) References Cited

U.S. PATENT DOCUMENTS 8,548,226 B2   10/2013  Sakano et al.
8,634,637 B2   1/2014   Hirschmueller et al.
(Continued)

FOREIGN PATENT DOCUMENTS

JP   2009-129318   6/2009
JP   4934701        5/2012
JP   5792662        10/2015

OTHER PUBLICATIONS

Extended European Search Report dated Sep. 18, 2018 ion European Patent Application No. 18162248.1, 8 pages.
(Continued)

*Primary Examiner* — David Perlman
(74) *Attorney, Agent, or Firm* — Oblon, McClelland, Maier & Neustadt, L.L.P.

(57) ABSTRACT

An image processing apparatus according to an embodiment includes a disparity-specific cost value calculation circuit configured to calculate the cost value of a disparity calculation target pixel in a source image and the cost value of cost value calculation target pixels at respective positions, in the horizontal direction, of pixels arranged from a position of the disparity calculation target pixel in a reference image up to a position by a maximum disparity apart from the disparity calculation target pixel at respective positions in the horizontal direction, an inter-line minimum cost value extraction circuit configured to extract a minimum cost value from a plurality of pixels which have the same positions in the horizontal direction as the positions of the cost value calculation target pixels, and a cost optimization operation circuit configured to perform a cost optimization operation through global optimization using the cost value corresponding to one line.

6 Claims, 7 Drawing Sheets

(51) Int. Cl.
*G06T 7/00* (2017.01)
*H04N 13/00* (2018.01)

(56) References Cited

U.S. PATENT DOCUMENTS

| | | |
|---|---|---|
| 9,438,877 B2 | 9/2016 | Wakabayashi et al. |
| 2017/0069072 A1 | 3/2017 | Sano |
| 2017/0353714 A1* | 12/2017 | Poulad ................ H04N 13/128 |
| 2019/0230347 A1* | 7/2019 | Itoh ..................... H04N 13/204 |

OTHER PUBLICATIONS

Rzeszutek, R., et al., "Disparity Estimation of Misaligned Images in a Scanline Optimization Framework", IEEE International Conference on Acoustics, ICASSP, XP032508129, May 2013, pp. 1523-1527.

Hirschmüller, H., "Stereo Processing by Semiglobal Matching and mutual Information", IEEE Transactions on Pattern Analysis and Machine Intelligence, vol. 30 No. 2, XP011195575, Feb. 2008, pp. 328-341.

* cited by examiner

IMAGE PROCESSING APPARATUS AND IMAGE PROCESSING SYSTEM

CROSS-REFERENCE TO RELATED APPLICATION

This application is based upon and claims the benefit of priority from the prior Japanese Patent Application No. 2017-181073 filed on Sep. 21, 2017; the entire contents of which are incorporated herein by reference.

FIELD

The present embodiment relates to an image processing apparatus and an image processing system.

BACKGROUND

When the same object is photographed using two horizontally aligned cameras, a deviation is caused in the horizontal direction at positions of the object in the two photographed images due to a difference between the camera positions. The difference in the position of the object between both images is called a "disparity." The distance from the camera to the object is proportional to a reciprocal of the disparity. That is, the disparity decreases as the distance increases and the disparity increases as the distance decreases.

Conventionally, block matching is widely used as a technique for calculating a disparity. Block matching calculates a disparity by cropping the respective images photographed by the two cameras into small regions (blocks) and searching for locations where a similarity (correlation value) in the small regions between both images becomes maximum. More specifically, when an image photographed by one camera (e.g., the left image photographed by the camera disposed on the left side) is used as a reference, a range of the image photographed by the other camera (e.g., the right image photographed by the camera disposed on the right side) in which the similarity is found corresponds to blocks in a range from the same coordinates as coordinates of a reference block in the left image to coordinates located by a maximum disparity (e.g., 128 pixels) away to the left side in the horizontal direction.

This block matching is simple processing and can basically calculate disparities at points independently of each other, and thereby enables high speed calculations. However, block matching has a problem that it is difficult to accurately calculate a disparity in a region where there is no texture or a region where there is a repetitive pattern.

On the other hand, a scheme (global matching) is proposed these days in which a cost function for disparities of all pixels in an image is defined and a combination of disparities that minimizes the function is obtained. Since this global matching performs global disparity estimation, it is possible to more accurately calculate a disparity even in a region where there is no texture or a region where there is a repetitive pattern.

However, global matching calculates a correlation value for each pixel using the same technique as block matching and then optimizes the own calculation result using calculation results of adjacent pixels. Global matching then integrates the optimized calculation results for pixels of a whole screen and calculates a disparity. That is, the accuracy is improved in global matching compared to block matching, whereas there is a problem that the amount of calculation or the amount of memory for temporarily storing calculation results becomes enormous.

Furthermore, it is realistically difficult to dispose two cameras completely horizontally and a deviation in the vertical direction or deviation in the rotation direction may be generated. A method may also be considered in which based on the premise that there is a certain degree of deviation in the vertical direction, the search range of similarity is widened not only in the horizontal direction but also in the vertical direction. In this case, there is another problem that the number of functional units and/or the amount of memory necessary to calculate a correlation value further increases.

DETAILED DESCRIPTION

An image processing apparatus according to an embodiment is provided with a disparity-specific similarity calculation circuit configured to calculate similarities between a disparity calculation target pixel in a source image and similarity calculation target pixels arranged in a horizontal direction from a position of the disparity calculation target pixel in a reference image up to a position apart by a maximum disparity from the disparity calculation target pixel, at respective positions in the horizontal direction, with the positions in a vertical direction of the similarity calculation target pixels being located within a range of a maximum deviation amount between the source image and the reference image. The image processing apparatus is also provided with an inter-line similarity extraction circuit configured to calculate and select one similarity from similarities of a plurality of pixels which have the same positions in the horizontal direction as the positions of the extracted similarity calculation target pixels in the reference image in which the positions in the vertical direction fall within a range of the maximum deviation amount in the vertical direction between the source image and the reference image. The image processing apparatus is further provided with a cost optimization operation circuit configured to perform a cost optimization operation through global optimization using the calculated similarities of the similarity calculation target pixels corresponding to one line.

Hereinafter, the embodiment will be described with reference to the accompanying drawings.

Figure 1:
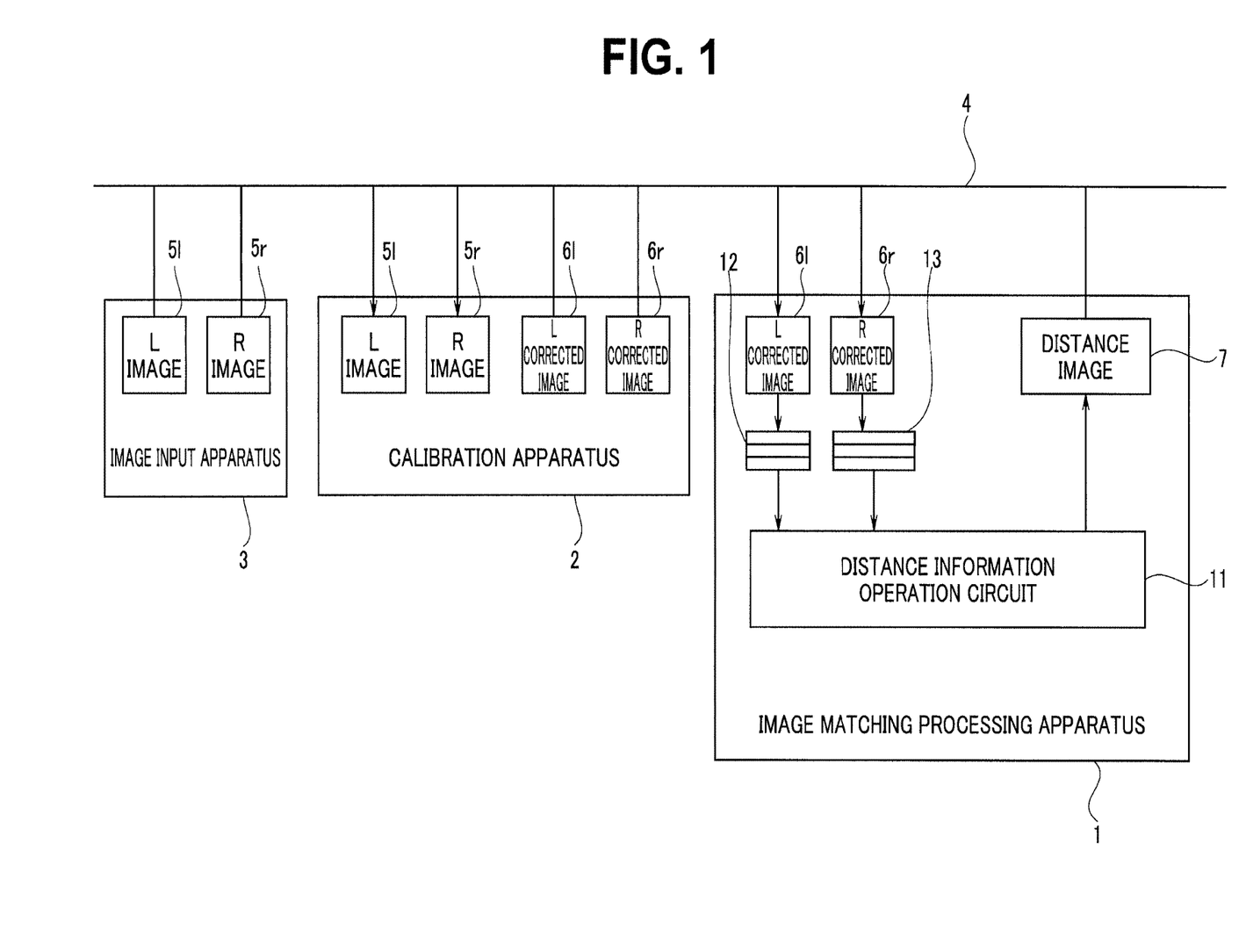
FIG. 1 is a schematic block diagram illustrating an example of a configuration of an image processing system according to an embodiment.

FIG. 1 is a schematic block diagram illustrating an example of a configuration of an image processing system according to the present embodiment. The image processing system is constructed of an image matching processing apparatus (hereinafter represented by "image processing apparatus") 1, a calibration apparatus 2, an image input apparatus 3 and a bus 4 configured to connect these apparatuses. FIG. 1 illustrates an image processing system configured to perform stereo matching processing using left-and-right disparity images photographed by two cameras.

The image input apparatus 3 receives a plurality of images picked up by cameras which are not shown (e.g., two images: an L image 5*l* picked up by a camera corresponding to the left eye and an R image 5*r* picked up by a camera corresponding to the right eye). The L image 5*l* and the R image 5*r* are inputted to the calibration apparatus 2 via the bus 4.

The calibration apparatus 2 is configured to correct static deviations inside or outside the camera resulting from setting conditions or individual differences among lenses. More specifically, internal parameters and external parameters are calculated in advance using picked-up images of a specific graphic pattern such as a grid-like pattern of a known size. By converting the L image 5*l* and the R image 5*r* input from the image input apparatus 3 using the internal parameters and the external parameters respectively, static deviations are corrected and a corrected L image 6*l* and a corrected R image 6*r* are generated. Note that the "internal parameters" are intended to indicate internal characteristics of a camera such as a focal length, an image principal point position or a lens distortion. On the other hand, the "external parameters" are parameters of rotation/translation movement in a three-dimensional space of a camera and in the case of a stereo image, the "external parameters" indicate, when one image is used as a reference, an extent of rotation/translation movement of the other image. The corrected L image 6*l* and the corrected R image 6*r* are inputted to the image processing apparatus 1 via the bus 4.

The image processing apparatus 1 performs stereo matching using the corrected images (the corrected L image 6*l* and the corrected R image 6*r*) to generate a distance image (image indicating the distance from the camera to the object) 7. The image processing apparatus 1 in FIG. 1 includes a distance information operation circuit 11, an L image line buffer (hereinafter referred to as "L line buffer") 12 and an R image line buffer (hereinafter referred to as "R line buffer") 13.

The L line buffer 12 is a buffer configured to store pixel data corresponding to a plurality of lines including a line at a disparity calculation target pixel position in the corrected L image 6*l*. The R line buffer 13 is a buffer configured to store pixel data corresponding to a plurality of lines including a line at a disparity calculation target pixel position in the corrected R image 6*r*.

Figure 2:
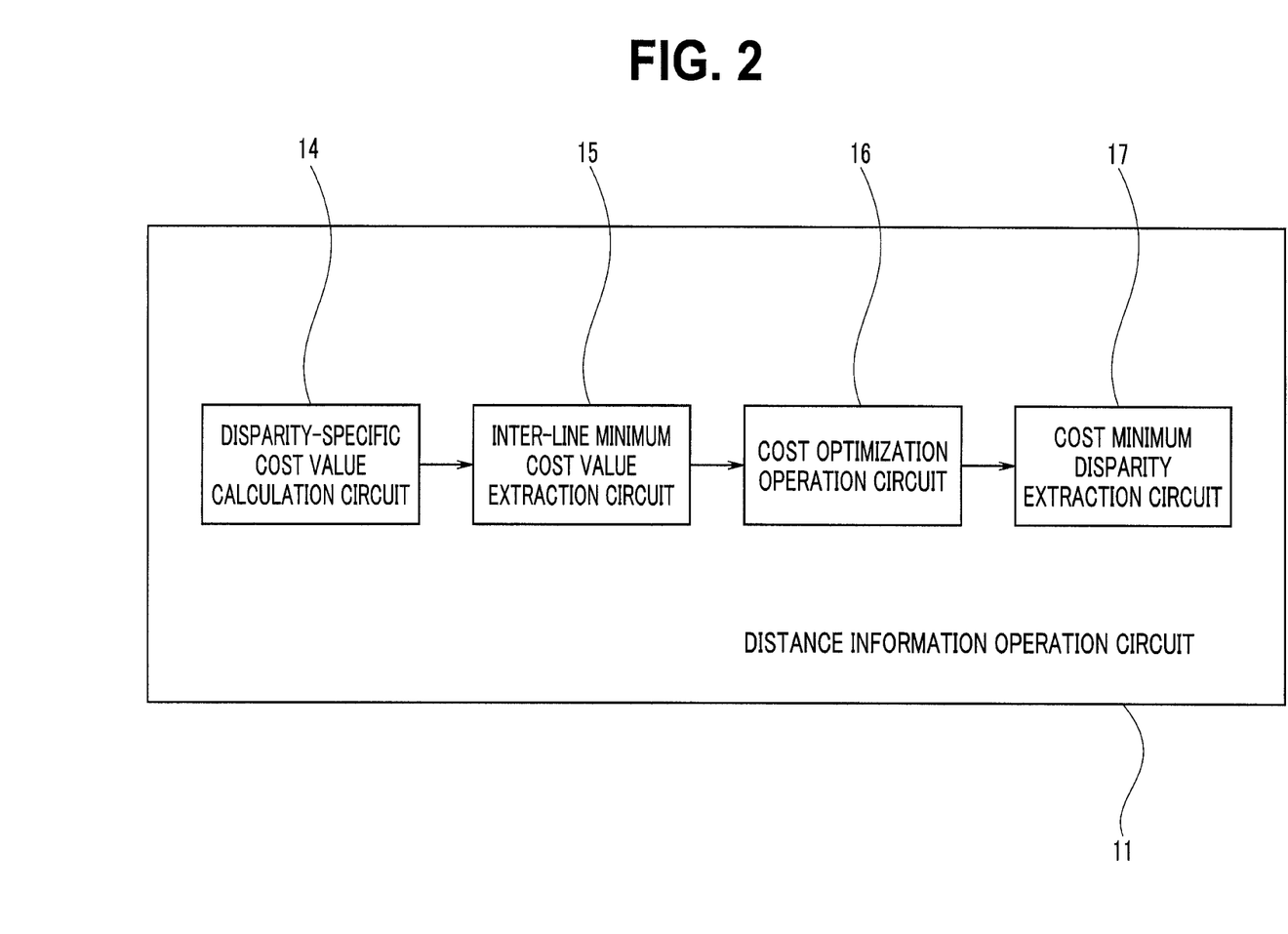
FIG. 2 is a block diagram illustrating an example of a configuration of a distance information operation circuit 11.

The distance information operation circuit 11 uses global matching such as a graph cutting method or an SGM method (semi-global matching method), calculates a disparity for each pixel of a source image and outputs the disparity as a disparity image. FIG. 2 is a block diagram illustrating an example of a configuration of the distance information operation circuit 11. The distance information operation circuit 11 includes a disparity-specific cost value calculation circuit 14, an inter-line minimum cost value extraction circuit 15, a cost optimization operation circuit 16 and a cost minimum disparity extraction circuit 17.

The disparity-specific cost value calculation circuit 14 as a disparity-specific similarity calculation circuit is configured to set a cost value calculation pixel region for disparity calculation target pixels in a reference image and calculate a cost value in the region. The cost value calculation pixel region has a size of (maximum deviation amount in the vertical direction) x (maximum disparity in the horizontal direction). When, for example, it is assumed in the reference image that coordinates representing a pixel position in the horizontal direction are X coordinates and coordinates representing a pixel position in the vertical direction are Y coordinates, if the position of the disparity calculation target pixel is (X, Y)=(150, 25), the cost value calculation pixel region is set as follows.

When, for example, the maximum disparity in the horizontal direction is 128 pixels, a search region of the reference image in the horizontal direction is within a range of X=150 to X=23. Here, when a deviation amount in the vertical direction is within one line above or below with respect to the line at the position of the disparity calculation target pixel, a maximum deviation amount in the vertical direction is 3 lines. Therefore, the cost value calculation pixel region corresponds to pixels within a range of (X, Y)=(150, 24) to (23, 24), (150, 25) to (23, 25) and (150, 26) to (23, 26).

Figure 3:
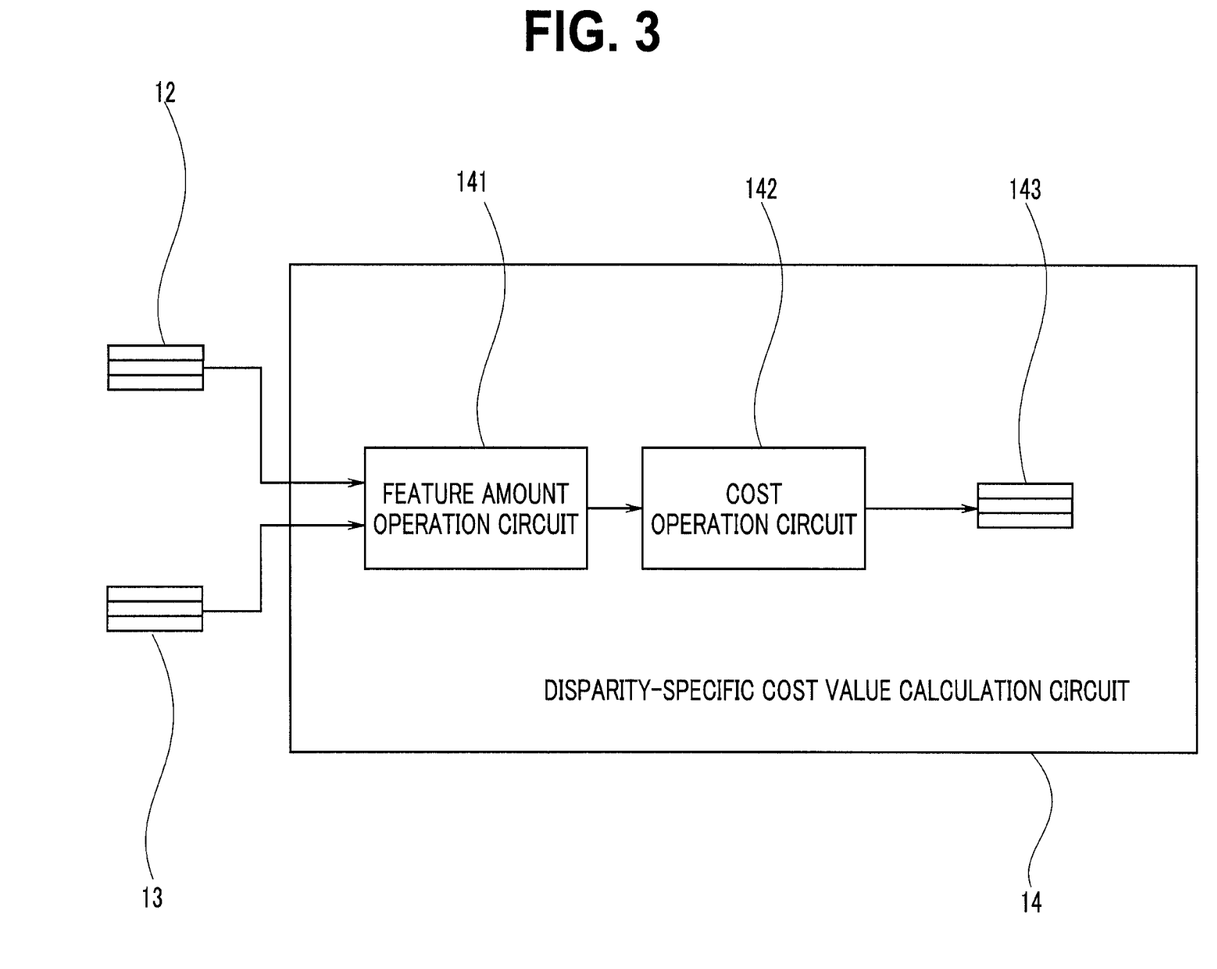
FIG. 3 is a block diagram illustrating an example of a detailed configuration of a disparity-specific cost value calculation circuit 14.

FIG. 3 is a block diagram illustrating an example of a detailed configuration of the disparity-specific cost value calculation circuit 14. The disparity-specific cost value calculation circuit 14 includes a feature amount operation circuit 141, a cost operation circuit 142 and a cost buffer 143.

The feature amount operation circuit 141 is configured to calculate pixel data of disparity calculation target pixels to be acquired from a line buffer in which the source image is stored and to calculate feature amount of pixel data in the cost value calculation pixel region to be acquired from a line buffer in which the reference image is stored. For example, an existing and quantified feature amount such as LBP (local binary pattern) is calculated. When the LBP is calculated as a feature amount, the luminance value of a feature amount calculation target pixel (central pixel) is compared with the luminance value of a peripheral pixel. When the luminance value of the peripheral pixel is larger than the luminance value of the central pixel of the peripheral pixel, bit "1" is assigned and when the luminance value of the peripheral pixel is smaller than the luminance value of the central pixel, bit "0" is assigned. Bits of the peripheral pixels are combined in predetermined order and assumed to be a feature amount (LBP sign) of the feature amount calculation target pixel. Note that bits to be assigned to the peripheral pixels may be "0" when the luminance value of the peripheral pixel is larger than the luminance value of the central pixel and "1" when the luminance value of the peripheral pixel is smaller than the luminance value of the central pixel.

The cost operation circuit 142 is configured to compare a feature amount relating to the disparity calculation target pixel of the source image with a feature amount relating to each pixel in the cost value calculation pixel region in the reference image and calculate a cost value for each disparity. For example, when an LBP sign is calculated as the feature amount, a Hamming distance between LBP signs of the source image and the reference image is calculated and assumed to be a cost value.

The cost buffer 143 stores the cost value calculated in the cost operation circuit 142 in association with the pixel position in the reference image.

Figure 4:
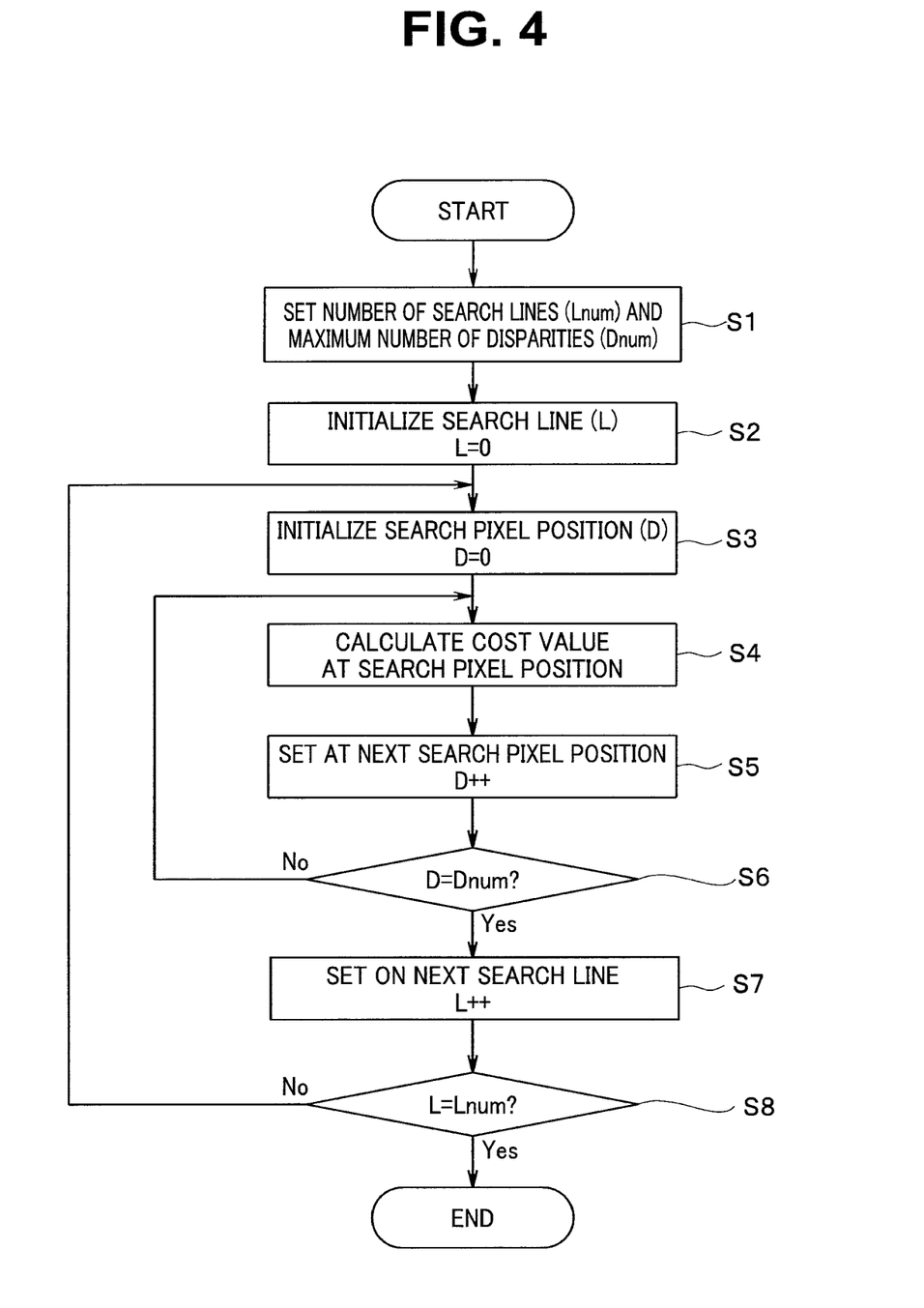
FIG. 4 is a flowchart describing an example of a cost value calculation procedure in the disparity-specific cost value calculation circuit 14.

FIG. 4 is a flowchart describing an example of a cost value calculation procedure in the disparity-specific cost value calculation circuit 14. Note that prior to the cost value calculation, suppose that the disparity calculation target pixel in the source image is set and a feature amount necessary to calculate a cost value is calculated. To create the distance image 7, disparities need to be calculated for all pixels of the source image. Normally, disparity calculation target pixel positions are sequentially set in order of raster scan from the pixel located at the top left of the source image to the pixel located at the bottom right and disparities at the respective pixel positions are calculated.

First, a cost value calculation target region is identified and the number of search lines (maximum deviation amount in the vertical direction) Lnum and a maximum number of disparities in the horizontal direction Dnum are set (Si). For example, in the case of the above-described example, Lnum=3 and Dnum=128 are set. Furthermore, the position of the first cost value calculation target pixel (search pixel position) is set. The first cost value calculation target pixel position is a pixel located at the top left of the cost value calculation target region. For example, in the above-described example, the first cost value calculation target pixel position is set (X, Y)=(23, 24).

Next, the cost value calculation target line is set to an initial state (L=0) (S2). Furthermore, the pixel position of the cost calculation target in the horizontal direction is set to an initial state (D=0) (S3).

Next, the cost operation circuit 142 calculates a cost value at the search pixel position and stores the cost value in the cost buffer 143 (S4). Next, the cost operation circuit 142 increments the pixel position (D) of the search pixel position in the horizontal direction by 1 and causes the search pixel position to move to the adjacent pixel (S5).

When the search pixel position is included in the cost value calculation target region (S6, No), the process returns to S4 and calculates a cost value at the pixel position. On the other hand, when the moved search target pixel position is not included in the cost value calculation target region (S6, Yes), the cost operation circuit 142 increments the pixel position (L) of the search pixel position in the vertical direction by 1 and causes the line in which the search pixel is included to move to a line which is one line lower (S7).

When the line-moved search pixel position is included in the cost value calculation target region (S8, No), the process returns to S3, sets the pixel position of the cost calculation target in the horizontal direction to an initial state (D=0) and calculates a cost value at the pixel position. On the other hand, when the moved search target pixel position is not included in the cost value calculation target region (S8, Yes), it is determined that calculations of the cost values for all pixels in the cost value calculation target region have ended and a series of processing steps for cost value calculation in the disparity-specific cost value calculation circuit 14 is ended.

Note that the method of calculating cost values in the disparity-specific cost value calculation circuit 14 is not limited to the aforementioned procedure in the flowchart in FIG. 4 but may be a procedure whereby cost values of all pixels in the cost value calculation target region can be calculated without omission. For example, the cost values may be calculated while moving the pixel position in the vertical direction instead of moving the pixel position in the horizontal direction. Furthermore, for example, the cost value calculation target region may be divided into a plurality of blocks and cost values in the respective blocks may be calculated in parallel.

Note that the method of calculating cost values in the disparity-specific cost value calculation circuit 14 is not limited to the aforementioned Hamming distance of the LBP sign, but an existing quantified cost function such as a SAD function may be used. When a method such as a SAD function whereby a cost can be directly calculated without calculating a feature amount from pixel data is used, it is possible to calculate the cost values by directly inputting pixel data of the disparity calculation target pixels acquired from the line buffer in which the source image is stored and pixel data in the cost value calculation pixel region acquired from the line buffer in which the reference image is stored, and thereby omit the feature amount operation circuit 141.

The inter-line minimum cost value extraction circuit 15 as the inter-line similarity extraction circuit extracts a minimum cost value for each disparity using the cost values calculated in the disparity-specific cost value calculation circuit 14. In the case of the above-described example, since the number of search lines is 3, there are three pixels in which disparity positions in the horizontal direction are identical in the cost value calculation pixel region. For example, when the cost value calculation pixel region is (X, Y)=(150, 24) to (23, 24), (150, 25) to (23, 25) and (150, 26) to (23, 26), there are three pixels of (X, Y)=(140, 24), (140, 25) and (140, 26), as pixels in which the disparity position in the horizontal direction is 10. The cost values of these three pixels are acquired from the disparity-specific cost value calculation circuit 14, a minimum cost value is extracted and assumed as a cost value at the disparity position.

Figure 5:
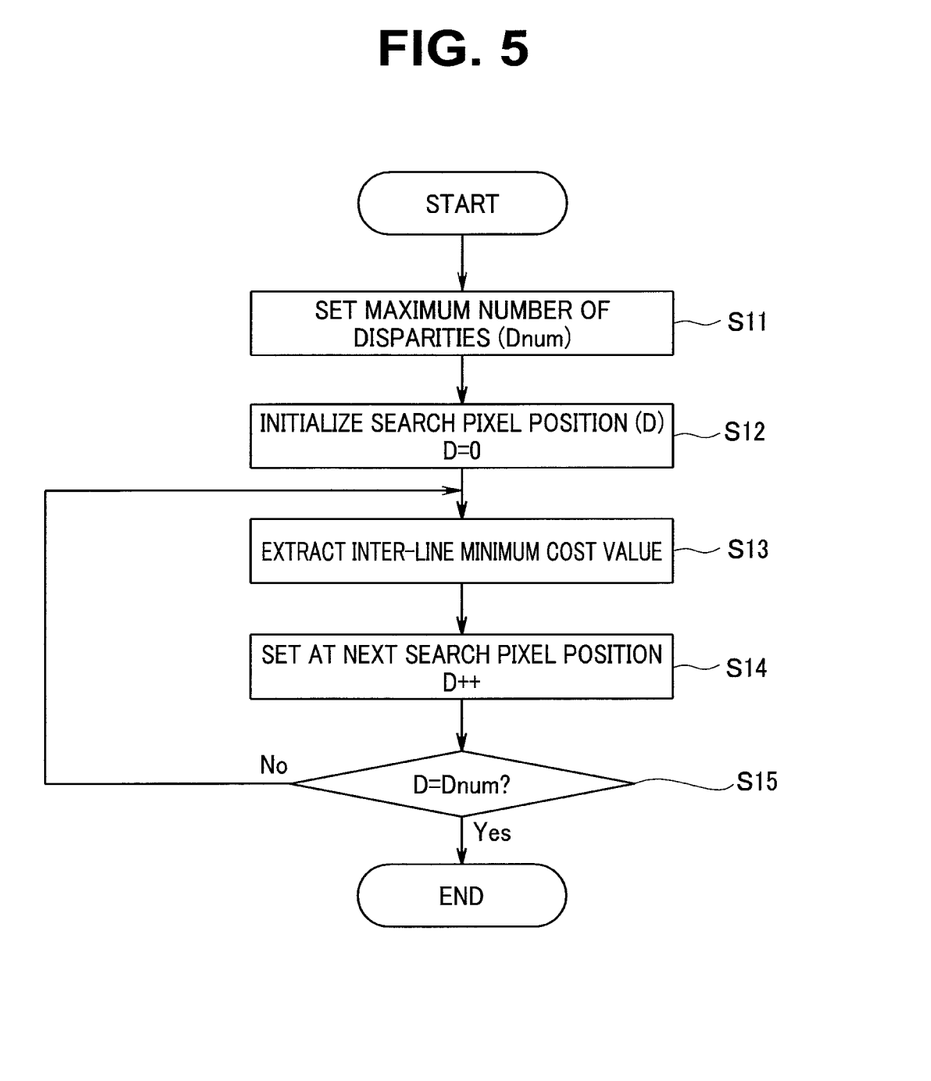
FIG. 5 is a flowchart describing an example of a cost value extraction procedure in an inter-line minimum cost value extraction circuit 15.

FIG. 5 is a flowchart describing an example of a minimum cost value extraction procedure in the inter-line minimum cost value extraction circuit 15. First, the cost value calculation target region is identified and a maximum number of disparities Dnum in the horizontal direction is set (S11). For example, in the case of the above-described example, Dnum=128 is set. Next, the pixel position of the inter-line minimum cost value extraction target in the horizontal direction (search target pixel position) is set to an initial state (D=0) (S12).

Next, pixels which are located within the cost value calculation target region and positions in the horizontal direction of which are identical to the search target pixel positions are identified, cost values of these pixels are compared and a minimum cost value is extracted (S13). Note that the cost values of the pixels to be used for the comparison may be acquired from the cost buffer 143 or requested from the cost operation circuit 142 as required.

Next, the pixel position (D) of the search pixel position in the horizontal direction is incremented by 1 and the search pixel position is moved to an adjacent pixel (S14). When the search pixel position is included in the cost value calculation target region (S15, No), the process returns to S13 and a minimum cost value at the pixel position is extracted. On the other hand, when the moved search target pixel position is not included in the cost value calculation target region (S15, Yes), it is determined that a minimum cost value has been extracted for all the disparity positions and a series of processing steps for inter-line minimum cost value extraction is ended.

The cost optimization operation circuit 16 calculates a synthetic cost value S which is a synthetic dissimilarity by global matching such as a graph cutting method or an SGM method (semi-global matching method), and thereby derives a disparity optimized for each pixel of the source image. The cost optimization operation circuit 16 calculates the synthetic cost value S using cost values corresponding to one line extracted by the inter-line minimum cost value extraction circuit 15.

Here, the method of calculating the synthetic cost value S according to the SGM method will be described. A plurality of routes along directions aggregating cost values from an end portion of the reference image toward the disparity calculation target pixel are defined and the synthetic cost value S is calculated as the sum total of cost in the respective routes. As the routes, cost of which is calculated, four routes are set along four directions normally directed to the disparity calculation target pixel and aggregating cost values from a horizontal rightward direction, horizontal leftward direction, vertical upward direction and vertical downward direction. Alternatively, in addition to these four directions, four routes are set along four directions directed to the disparity calculation target pixel and aggregating cost values from an upper rightward 45-degree direction, lower rightward 45-degree direction, lower leftward 45-degree direction and upper leftward 45-degree direction, a total of eight routes. Furthermore, the eight directions may be further divided into 16 directions or may be divided by three into 24 directions, and as such the number of routes is not limited to a specific number.

Cost Lr (p, d) in each route r is calculated using the following equation (1).

$$Lr\ (p,\ d) = C\ (p,\ d) + \min\{Lr\ (p-r,\ d),\ Lr\ (p-r,\ d-1) + P1,\ Lr\ (p-r,\ d+1) + P1,\ Lr\min\ (p-r) + P2\} \quad \text{Equation (1)}$$

In equation (1), C (p, d) represents a cost value of a pixel located at a position of disparity d from the disparity calculation target pixel position, min{ } represents a function to calculate a minimum value, and Lrmin (p–r) represents a minimum value of Lr (p–r, d) when a shift amount d is changed at coordinates where the pixel is shifted by one pixel from the disparity calculation target pixel position in the r direction. P1 and P2 represent preset penalty constants. Thus, the cost Lr (p, d) constitutes a recurrence formula whereby the cost value preceding by one pixel on a predetermined route in the r direction is selected and added to the cost value C (p, d), and optimization is thereby achieved.

By carrying out the cost calculation shown in equation (1) in a plurality of directions (e.g., 8 directions), overall optimization is performed approximately. That is, the synthetic cost value S is calculated as the sum total of the cost Lr (p, d) in each direction.

Note that when the cost is updated with reference to all the pixels within a region where Manhattan distance is equal to 1, the cost Lr (p, dy, dx) in each route r is calculated using the following equation (2).

$$Lr\ (p,\ dy,\ dx) = C\ (p,\ dy,\ dx) + \min\{Lr\ (p-r,\ dy,\ dx),\ Lr\ (p-r,\ dy,\ dx-1) + P1,\ Lr\ (p-r,\ dy-1,\ dx) + P1,\ Lr\ (p-r,\ dy,\ dx+1) + P1,\ Lr\ (p-r,\ dy+1,\ dx) + P1,\ Lr\min\ (p-r) + P2\} \quad \text{Equation (2)}$$

Figure 6:
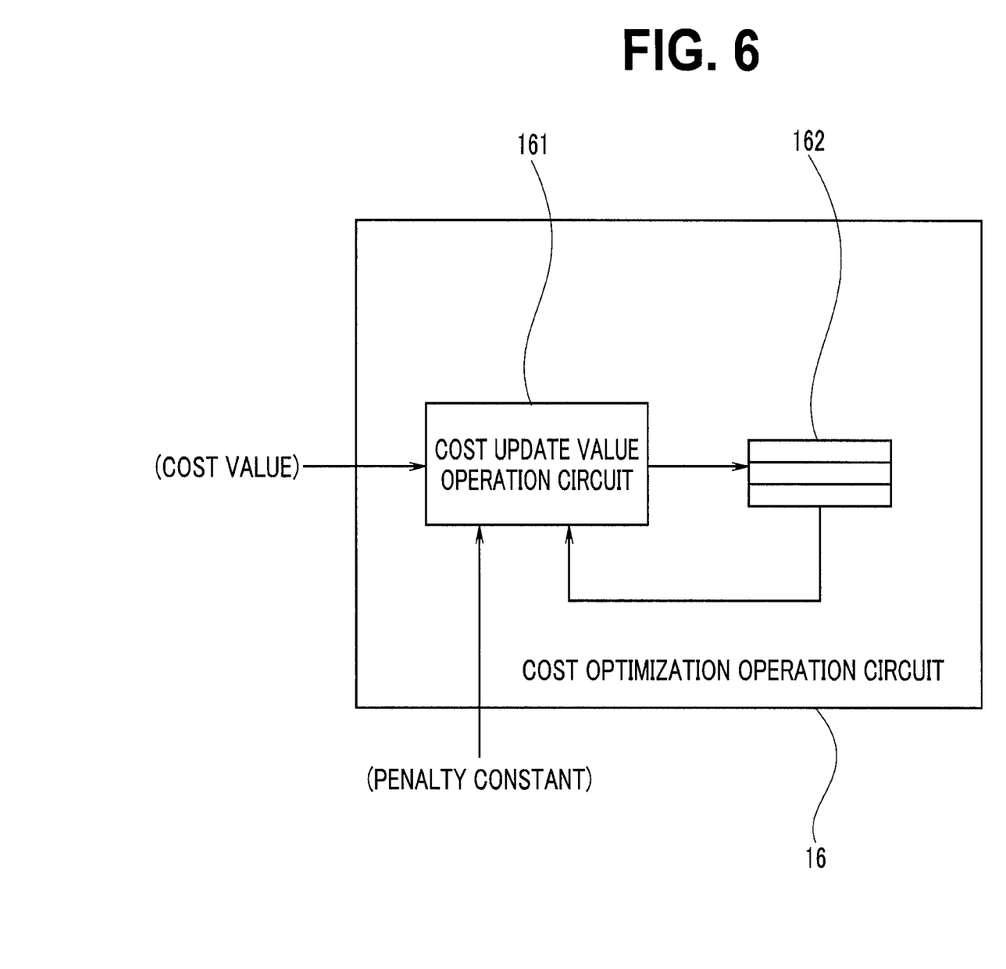
FIG. 6 is a block diagram illustrating an example of a detailed configuration of a cost optimization operation circuit 16.

FIG. 6 is a block diagram illustrating an example of a detailed configuration of the cost optimization operation circuit 16. The cost optimization operation circuit 16 includes a cost update value operation circuit 161 and a cost buffer 162. The cost update value operation circuit 161 carries out the above-described operation in equation (1) using the cost value input from the inter-line minimum cost value extraction circuit 15, predetermined penalty constants P1 and P2 input from a storage memory or the like which is not shown and cost of adjacent pixels stored in the cost buffer 162 and calculates the cost. The operation result is stored in the cost buffer 162 and used recursively to calculate cost in the cost update value operation circuit 161.

When the cost value calculation pixel region extends over a plurality of lines, in the conventional image processing apparatus, the cost optimization operation circuit 16 calculates a synthetic cost value S corresponding to three lines using the cost value of each line calculated in the disparity-specific cost value calculation circuit 14 as is. In fact, the synthetic cost value S is calculated using the above-described equation (2). In contrast, in the present embodiment, the inter-line minimum cost value extraction circuit 15 narrows cost values at the respective disparity positions down to one cost value, and thereafter the synthetic cost value S is calculated. That is, the inter-line minimum cost value extraction circuit 15 executes the following equation (3) to narrow down to a cost value C' (p, d).

$$C'\ (p,\ d) = \min\{C\ (p,\ dy=0,\ dx),\ C\ (p,\ dy-1,\ dx),\ C\ (p,\ dy=+1,\ dx)\} \quad \text{Equation (3)}$$

Therefore, the cost optimization operation circuit 16 calculates the synthetic cost value S by executing the following equation (4).

$$Lr\ (p,\ d) = C'\ (p,\ d) + \min\{Lr\ (p-r,\ d),\ Lr\ (p-r,\ d-1) + P1,\ Lr\ (p-r,\ d+1) + P1,\ Lr\min\ (p-r) + P2\} \quad \text{Equation (4)}$$

The equation (4) represents similar processing as in the equation (1). That is, the cost optimization operation circuit 16 has only to calculate the synthetic cost value S corresponding to one line regardless of a deviation amount in the vertical direction. Therefore, it is possible to reduce the number of memories or functional units used for operation and also reduce the processing time.

Note that the cost optimization operation circuit 16 is generally used to calculate cost in a specific one route. Therefore, the distance information operation circuit 11 is provided with the same number of cost optimization operation circuits 16 as the number of the routes set to calculate the synthetic cost value S.

Furthermore, the method of calculating the synthetic cost value S in the cost optimization operation circuit 16 is not limited to global matching such as the aforementioned graph cutting method or SGM method, but other existing techniques may also be used.

In addition, the method of calculating one similarity from among similarities of a plurality of pixels, the positions in the vertical direction of which are within a range of a maximum deviation amount in the vertical direction is not limited to the method of extracting the minimum cost value as described above. Another method, for example, a method of using an average value of cost values of a plurality of pixels may be used.

The cost minimum disparity extraction circuit 17 is configured to extract a disparity that minimizes the synthetic cost value S calculated by the cost optimization operation circuit 16. The cost minimum disparity extraction circuit 17 extracts disparities for all pixels of the source image, and generates and outputs the distance image 7.

In this way, according to the present embodiment, when a disparity is calculated using global matching such as a graph cutting method or an SGM method (semi-global matching method) or the like, if a deviation is generated between the source image and the reference image in the vertical direction due to dynamic deviation between cameras caused by vibration or the like and the cost value search range needs to be expanded not only in the horizontal direction but also in the vertical direction, the search range is reduced to a range corresponding to one line at the stage of cost values and cost optimization operation is performed for cost calculation. Therefore, it is possible to reduce the number of memories or functional units necessary for cost optimization operation and reduce the processing time.

Note that although a disparity is calculated using a cost value representing the degree of dissimilarity from a reference in the above description, a correlation value which is a reciprocal of the cost value and represents the degree of similarity to the reference may also be used. When the correlation value is used, the inter-line minimum cost value extraction circuit 15 extracts a correlation value with the maximum absolute value among correlation values of a plurality of lines at the same disparity position. Furthermore, the cost minimum disparity extraction circuit 17 extracts a disparity that maximizes the synthetic correlation value.

Figure 7:
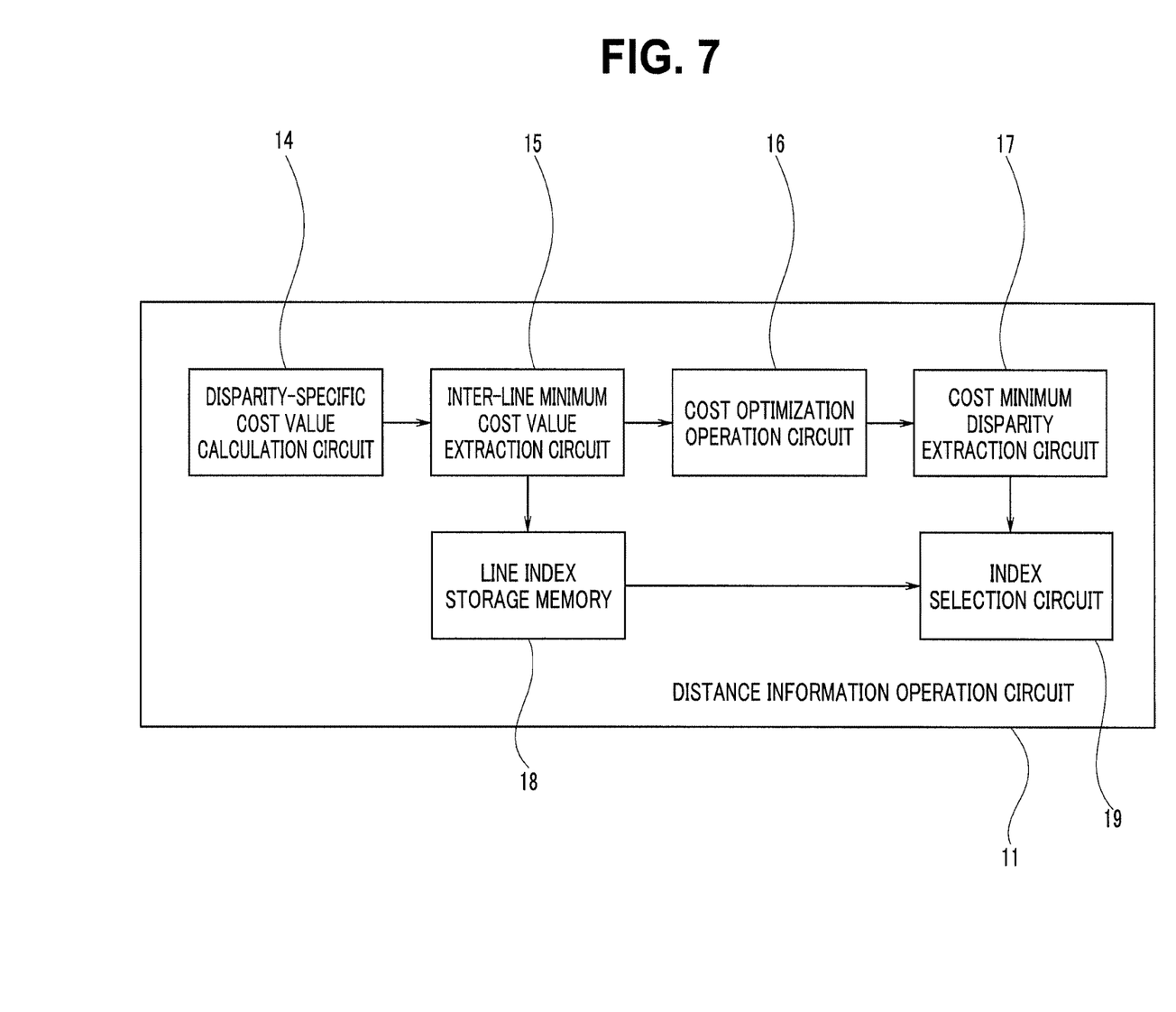
FIG. 7 is a block diagram illustrating another example of the configuration of the distance information operation circuit 11.

Furthermore, a configuration may be adopted in which the line position at the disparity position extracted by the cost minimum disparity extraction circuit 17 is outputted as a line index. FIG. 7 is a block diagram illustrating another example of the configuration of the distance information operation circuit 11. The distance information operation circuit 11 shown in FIG. 7 is further provided with a line index storage memory 18 and an index selection circuit 19 in addition to the components shown in FIG. 2. The line index storage memory 18 stores information on lines for which the inter-line minimum cost value extraction circuit 15 extracts cost values for each disparity position. The index selection circuit 19 selects, from the line index storage memory 18, information on the line at a disparity position where the synthetic cost value S extracted by the cost minimum disparity extraction circuit 17 becomes minimum and outputs the information. In this way, by outputting line index information, it is possible to grasp the deviation amount in the vertical direction between the source image and the reference image and feedback the deviation amount to correct a dynamic deviation.

Each "circuit" in the present specification is a conceptual one corresponding to each function of the embodiment and does not always have a one-to-one correspondence with a specific hardware or software routine. Therefore, in the present specification, description has been given assuming a virtual circuit block (circuit) having each function of the embodiment.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. An image processing apparatus, comprising:
    a disparity-specific similarity calculation circuit configured to calculate similarities between a disparity calculation target pixel in a source image and each of similarity calculation target pixels arranged in a horizontal direction from a position of the disparity calculation target pixel in a reference image up to a position apart by a maximum disparity from the disparity calculation target pixel, at respective positions in the horizontal direction, with the positions in a vertical direction of the similarity calculation target pixels being located within a range of a maximum deviation amount between the source image and the reference image;
    an inter-line similarity extraction circuit configured to calculate average values of similarities of a plurality of pixels that have the same positions in the horizontal direction as the positions of the similarity calculation target pixels in the reference image and the positions in the vertical direction of which are within a range of a maximum deviation amount in the vertical direction between the source image and the reference image and extract the average values as similarities of the similarity calculation target pixels corresponding to one line, from the calculated average values; and
    a cost optimization operation circuit configured to perform a cost optimization operation through global optimization using the extracted similarities of the similarity calculation target pixels corresponding to one line.

2. The image processing apparatus according to claim 1, wherein the cost optimization operation is performed by calculating a synthetic cost value using a semi-global matching method.

3. The image processing apparatus according to claim 1, further comprising a line index memory storing positions in the vertical direction of the pixels having the similarities extracted by the inter-line similarity extraction circuit.

4. The image processing apparatus according to claim 3, wherein the line index memory stores deviation amounts of the positions in the vertical direction of the pixels having the similarities selected by the inter-line similarity extraction circuit based on the positions in the vertical direction of the similarity calculation target pixels as references.

5. An image processing system comprising:
    an image input apparatus configured to input a source image and a reference image;
    a calibration apparatus configured to correct a static deviation between the source image and the reference image; and
    the image processing apparatus according to claim 1 configured to correct a dynamic deviation between the source image and the reference image corrected by the calibration apparatus and generate a distance image.

6. An image processing system comprising:
    an image input apparatus configured to input a source image and a reference image;
    a calibration apparatus configured to correct a static deviation between the source image and the reference image; and
    the image processing apparatus according to claim 3 configured to correct a dynamic deviation between the source image and the reference image corrected by the calibration apparatus and generate a distance image.

* * * * *